United States Patent
Suzuki et al.

(10) Patent No.: US 7,291,652 B2
(45) Date of Patent: Nov. 6, 2007

(54) DIANTIMONY PENTOXIDE SOL AND METHOD FOR ITS PREPARATION

(75) Inventors: Keitaro Suzuki, Chiba (JP); Yoshinari Koyama, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 286 days.

(21) Appl. No.: 10/795,301

(22) Filed: Mar. 9, 2004

(65) Prior Publication Data

US 2004/0192791 A1 Sep. 30, 2004

(30) Foreign Application Priority Data

Mar. 27, 2003 (JP) ............................. 2003-086901

(51) Int. Cl.
*B01F 3/12* (2006.01)
*C01G 30/00* (2006.01)

(52) U.S. Cl. ....................................................... 516/91
(58) Field of Classification Search ................... 516/91
See application file for complete search history.

(56) References Cited

U.S. PATENT DOCUMENTS

| 4,110,247 A | 8/1978 | Gower, II | |
|---|---|---|---|
| 4,348,301 A | 9/1982 | Crompton et al. | 516/91 |
| 4,988,505 A * | 1/1991 | Watanabe et al. | 516/91 |

FOREIGN PATENT DOCUMENTS

| DE | 29 31 523 A1 | 2/1981 |
|---|---|---|
| JP | 52-21298 | 2/1977 |
| JP | 52-123997 | 10/1977 |
| JP | 52-131998 | 11/1977 |
| JP | 53-20479 | 6/1978 |
| JP | 57-11848 | 3/1982 |
| JP | 59-232921 | 12/1984 |
| JP | 60-41536 | 3/1985 |
| JP | 60-137828 | 7/1985 |
| JP | 61-227918 | 10/1986 |
| JP | 2-180717 | 7/1990 |
| JP | 7-25549 | 3/1995 |
| WO | WO 00/56840 | 9/2000 |

OTHER PUBLICATIONS

Wang Hai-Tang, et al., "Preparation and stabilization of flame retardant colloidal Sb205 using ammonium biphosphate as stabilizer", Database CA 'Online!, AN 139:54936, XP-002350615, 2003, month unknown.

Wang Hai-Tang, et al., "Preparation and Stabilization of Flame Retardant Colloidal $Sb_2O_5$ Using Ammonium Biphosphate as Stabilizer", Fine Chemicals, vol. 20, No. 2, Feb. 2003, pp. 105-108.

* cited by examiner

*Primary Examiner*—Daniel S. Metzmaier
(74) *Attorney, Agent, or Firm*—Oblon, Spivak, McClelland, Maier & Neustadt, P.C.

(57) ABSTRACT

A sol having high oxidation purity and containing diantimony pentoxide particles having a primary particle size of from 2 to 50 nm and a $Sb_2O_3/Sb_2O_5$ weight ratio of at most 4 wt % is prepared by reacting a diantimony trioxide with an aqueous hydrogen peroxide solution in the presence of tunastate or molybdate.

10 Claims, No Drawings

DIANTIMONY PENTOXIDE SOL AND METHOD FOR ITS PREPARATION

The present invention relates to a method for producing a diantimony pentoxide sol having a high oxidation purity.

A diantimony pentoxide sol is one which is used as a flame retarding adjuvant for plastics, fibers, etc. as a microfiller for a surface treating agent for plastics or glass, as an inorganic ion exchanger, as a catalyst component, as a pigment component, etc. Usually, a highly concentrated sol (containing from 30 to 50 wt % of $Sb_2O_5$) stabilized by an organic base, is used.

Heretofore, as diantimony pentoxide sols, those obtained by the following methods have been known.

Namely, a method of deionizing an alkali metal antimonate by a cation exchange resin (JP-A-52-21298, U.S. Pat. No. 4,110,247, JP-B-57-11848), a method of reacting an alkali metal antimonate with an inorganic acid, followed by peptization (JP-A-60-41536, JP-A-61-227918), etc. have been known.

As a method other than the above, a method of oxidizing diantimony trioxide with an aqueous hydrogen peroxide solution at a high temperature has been reported (JP-B-53-20479, JP-A-52-21298, JP-A-52-123997, JP-A-52-131998).

Further, a method of adding an inorganic alkaline substance at the time of the oxidation reaction of diantimony trioxide with an aqueous hydrogen peroxide solution, to control the particle size, has been reported (JP-A-59-232921, JP-A-60-137828, JP-A-2-180717).

Further, a method for preparing a sol showing excellent stability at the time of preparing an organo sol, is disclosed wherein an oxidation reaction of diantimony trioxide with an aqueous hydrogen peroxide is carried out in the presence of from 0.1 to 50 wt %, as $SiO_2$, of an inorganic silicic compound (JP-B-7-25549).

The above-mentioned conventional methods for preparing diantimony pentoxide sols, have the following problems.

A diantimony pentoxide sol by an ion exchange method has a nearly spherical shape and thus has a characteristics that the dispersibility is good and the stability is also good. However, by such an ion exchange method, control of the particle size is difficult, and there is a drawback that a sol having a small particle size and high transparency can hardly be obtained, or a drawback that it is difficult to prepare diantimony pentoxide ($Sb_2O_5$) at a concentration of at least 10 wt %, and the operation to carry out separation and regeneration of the ion exchange resin, is cumbersome.

Whereas, by the oxidation method at a high temperature, it is possible to directly obtain a sol wherein diantimony pentoxide has a high concentration at a level of 30%, but it has a drawback that the viscosity tends to be high, and yet, the shape of colloidal particles is irregular shape, and the dispersibility is poor, and since the surface activity is large, the compatibility with a resin emulsion tends to be poor.

Further, as a method for improving the stability of a diantimony pentoxide sol obtained by the oxidation method, a method has been proposed wherein an inorganic alkaline substance is added during the preparation of the diantimony pentoxide sol to control the particle size. However, such a reaction carried out in the presence of an inorganic alkaline substance, has a drawback that the yellow color of the resulting diantimony pentoxide sol tends to be intensified, and there will be a restriction when it is to be used as a microfiller for a coating agent.

Further, a silica/antimony oxide composite sol prepared in the presence of an inorganic silicic compound, will contain silica in its composition, and thus has a drawback such that the refractive index of the sol itself tends to decrease.

By the above-mentioned conventional oxidation method, even if the reaction is, for example, carried out in a $H_2O_2/Sb_2O_3$ molar ratio of 3.0 i.e. in an excess amount exceeding 2.0, it is not easy to bring Sb(III) to a level of a $Sb_2O_3/Sb_2O_5$ weight ratio of at most 5%, and due to this remaining Sb(III), a part of the product takes an intermediate oxidized state, and the yellow color tone of the resulting sol tends to be intensified (Yellow Index (YI value) tends to be high), whereby the sol has a drawback that there will be a restriction when it is to be used for a transparent coating material.

It is an object of the present invention to overcome the above-mentioned problems of the conventional methods for preparing a diantimony pentoxide sol and to present a method for preparing a diantimony pentoxide sol having a high oxidation purity industrially.

In the first aspect, the present invention provides a sol comprising diantimony pentoxide particles having a primary particle size of from 2 to 50 nm and a $Sb_2O_3/Sb_2O_5$ weight ratio of at most 4 wt %.

In the second aspect, the present invention provides a method for preparing a sol comprising diantimony pentoxide particles as defined in the first aspect, which comprises reacting a diantimony trioxide dispersion with an aqueous hydrogen peroxide solution in the presence of a salt of isopolyacid.

In the third aspect, the present invention provides the method for preparing a sol comprising diantimony pentoxide particles, according to the second aspect, wherein the salt of isopolyacid and the diantimony trioxide are adjusted to be present in a ratio of $MO_3/Sb_2O_3=0.15$ to 10 wt %, as calculated as their oxides.

In the fourth aspect, the present invention provides the method for preparing a sol comprising diantimony pentoxide particles, according to the second or third aspect, wherein the salt of isopolyacid is a tungstate or a molybdate.

In the fifth aspect, the present invention provides the method for preparing a sol comprising diantimony pentoxide particles, according to any one of the second to fourth aspects, wherein hydrogen peroxide and diantimony trioxide are reacted in a $H_2O_2/Sb_2O_3$ molar ratio of 2.0.

Now, the present invention will be described in detail in reference to preferred embodiments.

The present invention provides a sol comprising diantimony pentoxide particles having a primary particle size of from 2 to 50 nm and a $Sb_2O_3/Sb_2O_5$ weight ratio of at most 4 wt %.

Here, the primary particle size is not the diameter of particles in an agglomerated form but is a diameter of one particle as individually separated, which can be measured by an electron microscope.

In the method for producing the above sol, the diantimony trioxide powder as the starting material may be one having an average particle size of at most 100 μm, but from the viewpoint of the dispersibility and the reactivity with the aqueous hydrogen peroxide solution, it is particularly preferably at most 10 μm, and usually, a diantimony trioxide powder having an average particle size within a range of from 1 to 5 μm is preferably employed.

The salt of isopolyacid to be used in the present invention may be a tungstate or a molybdate.

As the tungstate, sodium tungstate ($Na_2WO_4$), potassium tungstate ($K_2WO_4$), ammonium tungstate ($(NH_4)_2WO_4$) or lithium tungstate ($Li_2WO_4$) may, for example, be mentioned and preferably employed.

As the molybdate, sodium molybdate ($Na_2MoO_4$), potassium molybdate ($K_2MoO_4$) or ammonium molybdate (($NH_4)_2MoO_4$) may, for example, be mentioned and preferably employed.

Further, a permanganate such as potassium permanganate (KMnO4) or sodium permanganate ($NaMnO_4 \cdot 3H_2O$), or a bichromate such as ammonium bichromate (($NH_4)_2Cr_2O_7$), potassium bichromate ($K_2Cr_2O_7$) or sodium bichromate ($Na_2Cr_2O_7$) will also provide similar effects. However, they are highly hazardous as metals and colored, whereby their use is limited.

The sol comprising diantimony pentoxide particles of the present invention, is one obtainable by oxidizing diantimony trioxide dispersed in an aqueous medium with an aqueous hydrogen peroxide solution. The molar ratio of the hydrogen peroxide to the diantimony trioxide is preferably $H_2O_2/Sb_2O_3$ being 2.0. A molar ratio of less than 2.0 is an inadequate amount to have diantimony trioxide completely converted to diantimony pentoxide. If the molar ratio exceeds 2.0, $H_2O_2$ is stoichiometrically excessive, such being uneconomical and is not preferred, since a trouble such as foaming or deterioration of the resin tends to result due to the remaining excessive hydrogen peroxide, or since in order to remove such excessive hydrogen peroxide, a treating step such as decomposition by a catalyst or adsorption by activated carbon, is required to be added.

In a case where in the present invention, diantimony trioxide and an aqueous hydrogen peroxide solution are reacted in the presence of a salt of isopolyacid, the proportion of diantimony trioxide remaining in the formed diantimony pentoxide has been found decreased as compared with a case where no salt of isopolyacid is added, i.e. the remaining ratio of diantimony trioxide in the formed diantimony pentoxide as represented by the $Sb_2O_3/Sb_2O_5$ weight ratio has been found decreased. Namely, in the case where no salt of isopolyacid is added, the remaining ratio of diantimony trioxide in the diantimony pentoxide as represented by the $Sb_2O_3/Sb_2O_5$ weight ratio is 5% or higher, while in a case where diantimony trioxide and hydrogen peroxide are reacted in the presence of a salt of isopolyacid, the remaining ratio of diantimony trioxide as represented by the $Sb_2O_3/Sb_2O_5$ weight ratio has been found to be not more than 4%.

This indicates that oxidation has proceeded efficiently by a catalytic activity of the salt of isopolyacid during the reaction of diantimony trioxide and an aqueous hydrogen peroxide solution.

With the diantimony pentoxide sol obtained by the present invention, the color tone improvement effect has been observed by a reduction of the Yellow Index (YI value). This also indicates that the oxidation purity has been improved by the efficient oxidation. In a usual reaction of diantimony trioxide and an aqueous hydrogen peroxide solution, even if the reaction is carried out by adjusting the molar ratio of the aqueous hydrogen peroxide solution to diantimony trioxide ($H_2O_2/Sb_2O_3$) to be excessive as much as 3.0, it is difficult to bring the proportion of diantimony trioxide remaining in the formed diantimony pentoxide to a level of a $Sb_2O_3/Sb_2O_5$ weight ratio of not more than about 5%.

This salt of isopolyacid is preferably added before addition of diantimony trioxide. To an aqueous medium having the salt of isopolyacid dispersed therein, prescribed amounts of diantimony trioxide and an aqueous hydrogen peroxide solution are added, and the reaction is carried out with stirring. The order of addition of diantimony trioxide and the aqueous hydrogen peroxide solution is not particularly limited, but they are preferably added so that the molar ratio of hydrogen peroxide to diantimony trioxide ($H_2O_2/Sb_2O_3$) will readily reach a ratio of 2.0. Namely, it is preferred that after the dissolution of the salt of isopolyacid, diantimony trioxide is dispersed and finally the aqueous hydrogen peroxide solution is added.

In this reaction, addition of diantimony trioxide and the aqueous hydrogen peroxide solution is carried out by adding prescribed amounts of diantimony trioxide and the aqueous hydrogen peroxide solution. The addition of diantimony trioxide and the aqueous hydrogen peroxide solution may be carried out by adopting either a method of adding all at once or a method of carrying out the addition as divided into several times. Either by the method of adding all at once or by the method of adding dividedly in several times, the molar ratio of hydrogen peroxide to diantimony trioxide to be added every time is preferably maintained to be $H_2O_2/Sb_2O_3$ being 2.0. The concentration of the aqueous hydrogen peroxide solution to be used is from 30 to 60 wt %, usually preferably 35 wt %.

Further, by the addition and combined use of a compound of an element analogous to antimony (such as phosphoric acid, ascenic acid, etc.) as a particle size-controlling material, the oxidation efficiency will further be improved. Such an analogous element compound (such as phosphoric acid, ascenic acid or the like) may be added in an amount within a range of from 0 to 20 wt % based on $Sb_2O_3$, as calculated as an oxide represented by $P_2O_5$ or $As_2O_5$.

The amount of the salt of isopolyacid to be added during the reaction is usually from 0.15 to 10 wt %, preferably from 0.5 to 10 wt %, as calculated as its oxide $MO_3$ to $Sb_2O_3$ in a weight ratio of $MO_3/Sb_2O_3$. The amount may be less than 0.15 wt %, but the effect is thereby small, and even if the amount exceeds 10 wt %, the effect of addition will be saturated, and such is not efficient.

The reaction temperature is usually from 30 to 100° C., preferably from 70° C. to 100° C.

The reaction of diantimony trioxide and the aqueous hydrogen peroxide solution is an oxidation exothermic reaction. Accordingly, in some cases, it is preferred to carry out the reaction while cooling the reactor, or a reflux condenser may be installed. In the present invention, the reaction is carried out at a concentration of $Sb_2O_3$ being from 1 to 20 wt %, preferably from 5 to 15 wt %. It may be less than 1 wt %, but the concentration is too low, whereby the volume efficiency of the reactor decreases, such being uneconomical. Further, it may exceeds 20 wt %, but the reaction is an oxidation exothermic reaction, whereby the temperature control tends to be difficult, and secondary agglomeration among particles tends to increase, whereby the dispersibility also decreases.

The diantimony pentoxide sol obtained by the present invention has a pH of from 2 to 4 and is stable by itself. Further, the diantimony pentoxide sol obtained by the present invention has a high oxidation purity. Accordingly, depending upon the particularly application, in order to control the acidity or the cation exchange ability of the surface of the diantimony pentoxide sol, it may be treated with diantimony trioxide or with an inorganic base such as lithium hydroxide, sodium hydroxide or potassium hydroxide to adjust the pH to a level of from 4 to 10 to such an extent not to impair the stability of the sol.

The amount of the inorganic base to be added is such that, as calculated as oxides, the $M_2O/Sb_2O_5$ molar ratio is from 0 to 0.8. If the molar ratio exceeds 0.8, the inorganic base tends to be excessive, and the stability of the sol tends to deteriorate. The amount of diantimony trioxide to be added may depend also on the particle size, but the $Sb_2O_3/Sb_2O_5$ molar ratio is from 0 to 0.4, and if the molar ratio exceeds 0.4, the controlling effect will be saturated.

As a result of the measurement of X-ray diffraction, one having the sol surface treated with diantimony trioxide was confirmed to have a structure of hydrated diantimony pentoxide ($Sb_2O_5 \cdot nH_2O$) and to be not an intermediate oxide such as $Sb_6O_{13}$.

Further, it is possible to improve the dispersion stability by adding an organic base or a carboxylic acid. The organic base to be used in the present invention, may, for example, be an alkanolamine such as triethanolamine or monoethanolamine, an alkylamine such as n-propylamine or diisopropylamine, quaternary ammonium hydroxide or guanidine hydroxide. Among them, particularly preferred is an alkylamine. The amount of the organic base to be added, is usually from 1 to 30 wt %, preferably from 2 to 20 wt %, based on $Sb_2O_5$. It may be added in an amount exceeding 30 wt %, but there will be no further improvement in the dispersing effect.

The carboxylic acid to be used in the present invention, may, for example, be a monocarboxylic acid such as formic acid or acetic acid, a dicarboxylic acid such as oxalic acid, malonic acid, succinic acid, glutaric acid, adipic acid or maleic acid, or an oxycarboxylic acid such as lactic acid, tartaric acid, citric acid, glycolic acid, malic acid, gluconic acid or mandelic acid. Among them, particularly preferred is an oxycarboxylic acid. The amount of the carboxylic acid to be added, is usually from 0 to 30 wt %, preferably from 0.5 to 10 wt %, based on $Sb_2O_5$.

Further, in a case where it is desired to increase the concentration of the obtained sol, such concentration can be done by a usual method such as an evaporation method or an ultrafiltration method. Further, in order to increase the stability of the sol, it is preferred that the pH is adjusted to from 5 to 8 by means of the above-mentioned organic base or carboxylic acid, followed by concentration.

In the above modified diantimony pentoxide sol, the dispersing medium may be changed from water to a hydrophilic organic solvent. Such a hydrophilic organic solvent may, for example, be a lower alcohol such as methanol, ethanol or isopropanol, a linear amide such as dimethylformamide or N,N-dimethylamide, a cyclic amide such as N-methyl-2-pyrrolidone, a glycol ether such as methylcellosolve, ethylcellosolve, butylcellosolve or carbitol, or a polyhydric alcohol such as ethylene glycol or glycerol.

The above-mentioned change from water to the hydrophilic organic solvent may be carried out by a usual method, such as a reduced pressure or normal pressure distillation substitution method or a substitution method by means of an ultrafilter.

Now, the present invention will be described in further detail with reference to Examples and Comparative Examples. However, it should be understood that the present invention is by no means restricted to such specific Examples.

EXAMPLE 1

In a 2 L reaction flask equipped with a stirrer, in 1,693.1 g of pure water, 10.42 g (containing 7.20 g as calculated as $WO_3$) of sodium tungstate dihydrate ($Na_2WO_4 \cdot 2H_2O$, manufactured by Kisan Kinzoku Chemicals Co., Ltd., containing 69.1 wt % as calculated as $WO_3$) was dissolved, then 130.4 g of diantimony trioxide ($Sb_2O_3$ content: 99.5 wt %, manufactured by Guangdong Mikuni Antimony Industries, Co., Ltd.) was dispersed, and then 86.6 g of a 35 wt % hydrogen peroxide aqueous solution was added, whereupon the mixture was heated and reacted. The $H_2O_2/Sb_2O_3$ molar ratio was 2.0, and the proportion of $WO_3/Sb_2O_3$ was 5.5 wt %.

The liquid temperature during the reaction was from 85 to 90° C. After completion of the reaction, stirring was maintained at 90° C. for one hour to obtain 1,906 g of a yellowish white sol. The obtained sol had a primary particle size of from 15 to 25 nm, a pH of 2.50, an electroconductivity of 575 μs/cm, a $Sb_2O_5$ content of 7.28 wt %, a $Sb_2O_3$ content of 0.20 wt % and a remaining ratio ($Sb_2O_3/Sb_2O_5$) of 2.7 wt %.

EXAMPLE 2

In a 2 L reaction flask equipped with a stirrer, in 1,688 g of pure water, 10.42 g (containing 7.20 g as calculated as $WO_3$) of sodium tungstate dihydrate ($Na_2WO_4 \cdot 2H_2O$, manufactured by Kisan Kinzoku Chemicals Co., Ltd., containing 69.1 wt % as calculated as $WO_3$) was dissolved, then 130.4 g of diantimony trioxide ($Sb_2O_3$ content: 99.5 wt %, manufactured by Guangdong Mikuni Antimony Industries, Co., Ltd.) was dispersed, and then 5.14 g of a 85 wt % phosphoric acid aqueous solution and 86.6 g of a 35 wt % hydrogen peroxide aqueous solution were added, whereupon the mixture was heated and reacted. The $H_2O_2/Sb_2O_3$ molar ratio was 2.0, and the proportion of $WO_3/Sb_2O_3$ was 5.5 wt %, and the $P_2O_5/Sb_2O_3$ weight ratio was 2.4 wt %.

The liquid temperature during the reaction was from 85 to 90° C. After completion of the reaction, stirring was maintained at 90° C. for one hour to obtain 1,903 g of a slightly yellow sol. The obtained sol had a primary particle size of from 8 to 15 nm, a pH of 2.22, an electroconductivity of 2,910 μs/cm, a $Sb_2O_5$ content of 7.46 wt %, a $Sb_2O_3$ content of 0.04 wt %, and a remaining ratio ($Sb_2O_3/Sb_2O_5$) of 0.5 wt %. To 1,509.4 g of this sol, 22.4 g of a 25% NaOH aqueous solution, 6.6 g of diisopropylamine and 0.94 g of tartaric acid were added, adjusted and concentrated by a rotary evaporator to obtain 333.2 g of a modified diantimony pentoxide aqueous sol. The obtained sol had a specific gravity of 1.484, a pH of 4.66, a total $Sb_2O_5$ content of 34.0 wt % and a Yellow Index (YI value) of 59.8 as measured by a color difference meter (transmitted light).

EXAMPLE 3

In a 1 L reaction flask equipped with a stirrer, in 788.1 g of pure water, 1.94 g (containing 1.34 g as calculated as $WO_3$) of sodium tungstate dihydrate ($Na_2WO_4 \cdot 2H_2O$, manufactured by Kisan Kinzoku Chemicals Co., Ltd., containing 69.1 wt % as calculated as $WO_3$) was dissolved, then 60.68 g of diantimony trioxide ($Sb_2O_3$ content: 99.5 wt %, manufactured by Guangdong Mikuni Antimony Industries, Co., Ltd.) was dispersed, and then 2.39 g of a 85% phosphoric acid aqueous solution and 40.27 g of a 35 wt % hydrogen peroxide aqueous solution were added, whereupon the mixture was heated and reacted. The $H_2O_2/Sb_2O_3$ molar ratio was 2.0, the proportion of $WO_3/Sb_2O_3$ was 2.2 wt %, and the $P_2O_5/Sb_2O_3$ weight ratio was 2.4 wt %.

The liquid temperature during the reaction was from 80 to 95° C. After completion of the reaction, stirring was maintained at 90° C. for one hour to obtain 886.5 g of a slightly yellow sol. The obtained sol had a primary particle size of from 8 to 15 nm, a pH of 2.2, an electroconductivity of 2,230 μs/cm, a $WO_3$ content of 0.15 wt %, a $Sb_2O_5$ content of 7.27 wt %, a $Sb_2O_3$ content of 0.21 wt % and a remaining ratio ($Sb_2O_3/Sb_2O_5$) of 2.9 wt %.

EXAMPLE 4

In a 10 L reaction flask equipped with a stirrer, in 8,478 g of pure water, 10.42 g (containing 7.20 g as calculated as $WO_3$) of sodium tungstate dihydrate ($Na_2WO_4.2H_2O$, manufactured by Kisan Kinzoku Chemicals Co., Ltd., containing 69.1 wt % as calculated as $WO_3$) was dissolved, then 652.0 g of diantimony trioxide ($Sb_2O_3$ content: 99.5 wt %, manufactured by Guangdong Mikuni Antimony Industries, Co., Ltd.) was dispersed, and then 25.72 g of a 85% phosphoric acid aqueous solution and 432.7 g of a 35 wt % hydrogen peroxide aqueous solution were added, whereupon the mixture was heated and reacted. The $H_2O_2/Sb_2O_3$ molar ratio was 2.0, the proportion of $WO_3/Sb_2O_3$ was 1.1 wt %, and the $P_2O_5/Sb_2O_3$ weight ratio was 2.4 wt %.

The liquid temperature during the reaction was from 80 to 95° C. After completion of the reaction, stirring was maintained at 90° C. for one hour to obtain 9,596 g of a slightly yellow sol. The obtained sol had a primary particle size of from 8 to 15 nm, a pH of 2.1, an electroconductivity of 2,130 μs/cm, a $WO_3$ content of 0.075 wt %, a $Sb_2O_5$ content of 7.21 wt %, a $Sb_2O_3$ content of 0.26 wt % and a remaining ratio ($Sb_2O_3/Sb_2O_5$) of 3.6 wt %.

EXAMPLE 5

In a 3 L reaction flask equipped with a stirrer, in 2,117.9 g of pure water, 1.54 g (containing 0.90 g as calculated as $MoO_3$) of sodium molybdate ($Na_2MoO_4.2H_2O$, manufactured by Junsei Chemical Co., Ltd., containing 58.6 wt % as calculated as $MoO_3$) was dissolved, then 163.0 g of diantimony trioxide ($Sb_2O_3$ content: 99.5 wt %, manufactured by Guangdong Mikuni Antimony Industries, Co., Ltd.) was dispersed, and then 6.43 g of a 85% phosphoric acid aqueous solution and 108.2 g of a 35 wt % hydrogen peroxide aqueous solution were added, whereupon the mixture was heated and reacted. The $H_2O_2/Sb_2O_3$ molar ratio was 2.0, the proportion of $MoO_3/Sb_2O_3$ was 0.55 wt %, and the $P_2O_5/Sb_2O_3$ weight ratio was 2.4 wt %.

The liquid temperature during the reaction was from 80 to 95° C. After completion of the reaction, stirring was maintained at 90° C. for one hour to obtain 2,396.0 g of a slightly green sol. The obtained sol had a primary particle size of from 10 to 15 nm, a pH of 2.2, an electroconductivity of 1,530 μs/cm, a $MoO_3$ content of 0.15 wt %, a $Sb_2O_5$ content of 7.26 wt %, a $Sb_2O_3$ content of 0.22 wt % and a remaining ratio ($Sb_2O_3/Sb_2O_5$) of 3.0 wt %.

EXAMPLE 6

Into a 3 L reaction flask equipped with a stirrer, 2,399 g of the sol obtained in Example 4 was charged, and 35.6 g of a 25% NaOH aqueous solution, 14.4 g of diisopropylamine and 2.70 g of tartaric acid were added with stirring, whereupon concentration was carried out by means of an ultrafilter, to obtain 524.7 g of a modified diantimony pentoxide aqueous sol. The obtained sol had a specific gravity of 1.454, a pH of 4.83, a total $Sb_2O_5$ content of 34.3 wt % and a yellow Index (YI value) of 60.2 as measured by a color difference meter (transmitted light). Further, 359.6 g of this sol was put into a 1 L reaction flask equipped with a stirrer, and water was distilled off while gradually adding 3 L of methanol under atmospheric pressure, to obtain 365 g of a modified diantimony pentoxide methanol sol having water of the aqueous sol substituted by methanol. This sol had a primary particle size of from 8 to 15 nm, a specific gravity of 1.146, a viscosity of 1.8 mPa·s, a pH of 8.3, a total $Sb_2O_5$ content of 32.1 wt %, a water content of 2.5% and a transmittance of 52%.

EXAMPLE 7

Into a 10 L reaction flask equipped with a stirrer, 7,197 g of the sol obtained in Example 4 was charged, and heated to a liquid temperature of from 90 to 95° C., whereupon 97.8 g of diantimony trioxide was added in a ($Sb_2O_3$ (modified content))/($Sb_2O_5$ (sol content)) molar ratio of 0.2, followed by further aging at 90° C. for one hour for modification. The obtained sol had a pH of 2.18, an electroconductivity of 1,850 μs/cm, a total $Sb_2O_5$ content of 8.9 wt %, and a particle size of from 7 to 12 nm as observed by an electron microscope. To this sol, 99.5 g of a 25% NaOH aqueous solution, 45.4 g of diisopropylamine and 5.3 g of tartaric acid were added, adjusted and concentrated by an ultrafilter to obtain 1,631.1 g of a modified diantimony pentoxide aqueous sol. The obtained sol had a primary particle size of from 10 to 15 nm, a specific gravity of 1.526, a pH of 6.02, and a total $Sb_2O_5$ content of 38.0 wt %. Further, this sol was transferred to a 3 L reaction flask equipped with a stirrer, and water was distilled off while gradually adding 13 L of methanol, to obtain 2,000 g of a modified diantimony pentoxide methanol sol having water of the aqueous sol substituted by methanol. This sol had a specific gravity of 1.134, a viscosity of 1.3 mPa·s, a pH of 6.4, a total $Sb_2O_5$ content of 30.8 wt %, a water content of 2.9% and a transmittance of 74%.

COMPARATIVE EXAMPLE 1

In a 1 L reaction flask equipped with a stirrer, in 792.9 g of pure water, 60.33 g of diantimony trioxide ($Sb_2O_3$ content: 99.5 wt %, manufactured by Guangdong Mikuni Antimony Industries, Co., Ltd.) was dispersed, and then 40.07 g of a 35 wt % hydrogen peroxide aqueous solution was added, whereupon the mixture was heated and reacted. The $H_2O_2/Sb_2O_3$ molar ratio was 2.0.

The liquid temperature during the reaction was from 85 to 95° C. After completion of the reaction, stirring was maintained at 90° C. for one hour to obtain 885.0 g of a yellowish white sol. The obtained sol had a primary particle size of from 15 to 25 nm, a pH of 2.1, an electroconductivity of 430 μs/cm, a $Sb_2O_5$ content of 6.83 wt %, a $Sb_2O_3$ content of 0.60 wt %, and a remaining ratio ($Sb_2O_3/Sb_2O_5$) of 8.8 wt %. To 800 g of this sol, 11.9 g of a 25% NaOH aqueous solution, 4.2 g of diisopropylamine and 0.61 g of tartaric acid were added, adjusted and concentrated by a rotary evaporator to obtain 185.1 g of a modified diantimony pentoxide aqueous sol. The obtained sol had a specific gravity of 1.416, a pH of 4.22, a total $Sb_2O_5$ content of 32.4 wt % and a Yellow Index (YI value) of 145.2 as measured by a color difference meter (transmitted light).

COMPARATIVE EXAMPLE 2

In a 1 L reaction flask equipped with a stirrer, in 785.8 g of pure water, 60.33 g of diantimony trioxide ($Sb_2O_3$ content: 99.5 wt %, manufactured by Guangdong Mikuni Antimony Industries, Co., Ltd.) was dispersed, and then 2.49 g of a 85% phosphoric acid aqueous solution and 40.07 g of a 35 wt % hydrogen peroxide aqueous solution were added, whereupon the mixture was heated and reacted. The $H_2O_2/Sb_2O_3$ molar ratio was 2.0, and the $P_2O_5/Sb_2O_3$ weight ratio was 2.4 wt %.

The liquid temperature during the reaction was from 80 to 95° C. After completion of the reaction, stirring was maintained at 90° C. for one hour to obtain 887.5 g of a yellow sol. The obtained sol had a primary particle size of from 10 to 15 nm, a pH of 2.1, an electroconductivity of 1,830 µs/cm, a $Sb_2O_5$ content of 7.08 wt %, a $Sb_2O_3$ content of 0.38 wt %, and a remaining ratio ($Sb_2O_3/Sb_2O_5$) of 5.4 wt %.

The diantimony pentoxide sol of the present invention is useful as a flame retardant adjuvant for plastics, fibers, etc., or for inorganic ion exchangers, etc. Further, one having a primary particle size of the sol being from 5 to 30 nm, is excellent in transparency and dispersibility and thus, is useful as a microfiller for a coating agent which is useful for shielding ultraviolet rays or for adjusting the refractive index by coating it on the surface of a transparent substrate such as plastics or glass.

The entire disclosure of Japanese Patent Application No. 2003-086901 filed on Mar. 27, 2003 including specification, claims and summary is incorporated herein by reference in its entirety.

What is claimed is:

1. A method for preparing a sol, comprising:
    reacting a diantimony trioxide dispersion with an aqueous hydrogen peroxide solution in the presence of a tungstate or molybdate;
    wherein said sol comprises diantimony pentoxide particles having a primary particle size of from 2 to 50 nm and a $Sb_2O_3/Sb_2O_5$ weight ratio of at most 4 wt %;
    wherein (i) the tungstate or molybdate and (ii) the diantimony trioxide are adjusted to be present in a ratio of $MO_3/Sb_2O_3$=0.15 to 10 wt %, as calculated as their oxides, wherein M is tungstate or molybdate.

2. The method according to claim 1, wherein hydrogen peroxide and diantimony trioxide are reacted in a $H_2O_2/Sb_2O_3$ molar ratio of 2.0.

3. The method as claimed in claim 1, wherein said diantimony trioxide is in the form of a powder having particles with an average particle size of at most 10 µm.

4. The method as claimed in claim 1, wherein said tungstate is sodium tungstate ($Na_2WO_4$, potassium tungstate ($K_2WO_4$), ammonium tungstate (($NH_4)_2WO_4$) or lithium tungstate ($Li_2WO_4$).

5. The method as claimed in claim 1, wherein said molybdate is sodium molybdate ($Na_2MoO_4$), potassium molybdate ($K_2MoO_4$) or molybdate (($NH_4)_2MoO_4$).

6. The method as claimed in claim 1, wherein said sol further comprises a particle size-controlling material.

7. The method as claimed in claim 1, comprising adding 0.5 to 10 wt % of said tungstate or molybdate as calculated as its oxide $MO_3$ to $Sb_2O_3$ in a weight ratio of $MO_3/Sb_2O_3$, wherein M is tungsten or molybdenum.

8. The method as claimed in claim 1, which proceeds at a reaction temperature of from 30 to 100° C.

9. The method as claimed in claim 1, wherein said sol has a pH of from 2 to 4.

10. The method as claimed in claim 1, wherein said sol has a pH of from 4 to 10.

* * * * *